United States Patent [19]

Urabe et al.

[11] Patent Number: 5,350,790

[45] Date of Patent: *Sep. 27, 1994

[54] POLYCARBONATE RESIN COMPOSITION FOR OPTICAL USE

[75] Inventors: Yoshitomi Urabe; Hironori Hayashida, both of Kitakyushu; Yoshiaki Ohtani, Nakama, all of Japan

[73] Assignee: Mitsubishi Kasei Corporation, Tokyo, Japan

[*] Notice: The portion of the term of this patent subsequent to Oct. 9, 2010 has been disclaimed.

[21] Appl. No.: 41,189

[22] Filed: Apr. 1, 1993

Related U.S. Application Data

[62] Division of Ser. No. 704,095, May 22, 1991, Pat. No. 5,254,614.

[30] Foreign Application Priority Data

Jun. 8, 1990 [JP] Japan ................... 2-151316
Jun. 8, 1990 [JP] Japan ................... 2-151318

[51] Int. Cl.$^5$ ............. C08J 7/14; C08K 5/09; C08L 69/00

[52] U.S. Cl. .................. 524/321; 524/291; 524/298; 524/300; 524/320; 524/322; 524/537; 524/513; 525/146; 525/148; 525/439

[58] Field of Search ............. 524/291, 298, 300, 320, 524/321, 322, 537, 513; 525/146, 148, 439

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

This invention provides a polycarbonate resin composition for optical use and an optical disc substrate manufactured therefrom. Polycarbonate resin is mixed with at least one kind of carboxylic acid selected from aliphatic carboxylic acids having 1 to 10 carbon atoms in which hydrogen atoms of aliphatic group may be substituted by hydroxyl groups; or aromatic carboxylic acids in which hydrogen atoms of the aromatic ring may be substituted by low alkyl groups, hydroxyl groups, or halogen atoms.

The amount of the carboxylic acids is 5 to 1000 ppm based on the polycarbonate resin.

15 Claims, No Drawings

POLYCARBONATE RESIN COMPOSITION FOR OPTICAL USE

This is a division of application Ser. No. 07/704,095, filed on May 22, 1991, now U.S. Pat. Nos. 5,254,614.

BACKGROUND OF THE INVENTION

This invention relates to a polycarbonate resin composition for optical use, and in particular, a polycarbonate resin composition which can manufacture an optical disc substrate which has excellent transparency, and is free from internal defects.

Because of its excellent transparency, heat-resistance, and dimensional stability, polycarbonate is often used as a molding material for optical products, including optical discs, lenses, and prisms. These molding materials for optical use generally must be free from internal defects (nicks) in addition to being colorless and having high transparency qualities.

On one hand, polycarbonate is usually manufactured through the reaction of a dihydroxydiaryl such as bisphenol A with phosgene in the presence of an alkaline, and in a solvent mixture comprising water and hydrocarbon halide. However, in the case of polycarbonate for optical use, the molecular weight of polymers must be adjusted to a relatively low level in order to improve its moldability, and the mixing of the solvent and by-product salt in the polymer must be suppressed as much as possible by sufficiently refining the product polymer and preventing the attachment of foreign substances.

When an optical disc substrate is manufactured from polycarbonate resin obtained by the aforementioned method, by injection molding, for example, the disc has no problems immediately after molding, but when subjected to high temperature and humidity for an extended period of time, this causes fine point defects of several ten micron diameter to develop in the disc.

Such point defects are usually very small, and they occur infrequently, but when used as an optical disc substrate, they affect the reliability of recorded information, such as the development of signal read errors; therefore, it is important to suppress the occurrence of defects whenever practical. The cause of the occurrence of point defects is not clear, but may be attributable to partial hydrolysis in the polycarbonate resin. Attempts have been made to prevent this problem by mixing various types of stabilizing agents into the polycarbonate resin, but no adequate method has been found to date that can suppress the aforementioned defects without damaging impairing optical functions.

It is an object of this invention to provide a polycarbonate resin composition for optical use mixed with specific types of compounds to form optical products with an infrequent occurrence of the point defects, without coloring, and having good transparency, even when they are stored under high temperatures and humidity for an extended period of time.

It is another object of this invention to provide an optical disc substrate which is excellent in transparency, free from coloring, and causing few point defects.

SUMMARY OF THE INVENTION

This invention provides a polycarbonate resin composition for optical use and an optical disc substrate comprised thereof, with the following characteristics. The polycarbonate resin is mixed with at least one type of carboxylic acid, selected from aliphatic carboxylic acids having 1 to 10 carbon atoms in which hydrogen atoms of the aliphatic group may be substituted by hydroxyl groups; and aromatic carboxylic acids in which hydrogen atoms of the aromatic ring may be substituted by low alkyl groups, hydroxyl groups, or halogen atoms.

The amount of the carboxylic acids is 5 to 1000 ppm based on the polycarbonate resin.

DETAILED DESCRIPTION OF THE INVENTION

The polycarbonate resin of the present invention is obtained by various manufacturing methods, including, for example, polymers and copolymers obtained by the phosgene process, in which various dihydroxydiaryl compounds are reacted with phosgene, or by the interesterification process in which dihydroxydiallyl compounds are reacted with carbonic acid ester such as diphenylcarbonate. Preferably, the polymer is obtained by reacting dihydroxydiaryl compounds with phosgene in a solvent mixture comprising water and hydrocarbon halide, in the presence of an alkali.

The most preferable polycarbonate resin in the present invention is manufactured from 2,2-bis (4-hydroxyphenyl) propane (bisphenol A).

Examples of the dihydroxydiaryl compounds include bis(4-(hydroxyallyl) alkanes such as bisphenol A, bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)-phenylmethane, 2,2-bis(4-hydroxy-3-methylphenyl)propane, 1,1-bis(4-hydroxy-3-tertiary butylphenyl)propane, 2,2-bis(4-hydoxy-3-bromophenyl)propane, 2,2-bis(4-hydroxy-3,5-dibromophenyl)propane, 2,2-bis(4-hydroxy- 3,5-dichlorophenyl)propane, bis (hydroxyaryl)cycloalkanes such as 1,1-bis (4-hydroxyphenyl)-cyclopentane, 1,1-bis (4-hydroxyphenyl) cyclohexane, dihydroxydiaryl ethers such as 4,4'-dihydroxydiphenylether, 4,4'-dihydroxy-3,3'-dimethyldiphenylether, dihydroxydiarylsulfides such as 4,4'-dihydroxydiphenylsulfide, 4,4'-dihydroxy-3,3-dimethyldiphenylsulfide, dihydroxydiarylsulfoxides such as 4,4'-dihydroxy-3,3'-dimethyl-diphenylsulfoxide, and dihydroxydiarylsulfones such as 4,4'-dihydroxydiphenylsulfone, 4,4'-dihydroxy-3,3'-dimethyldiphenylsulfone.

These dihydroxydiaryl compounds are either used singularly, or mixed with two or more other kinds; they also may be used when mixing hydroquinone, resorcin, or 4,4'-dihydroxydiphenyl or the like.

Because the polycarbonate resin used in the present invention requires precise moldability when used for optical purposes, its viscosity average molecular weight should preferably be 12,000 to 20,000, and more preferably 13,000 to 18,000.

The viscosity average molecular weight in this invention means the value obtained from $\eta sp$ measured at 20° C. by using a methylene chloride solution containing 6.0 g/liter of the polymer, by a calculation from the following two formulas.

$$\eta sp/c = [\eta](1 + K'\eta sp) \quad 1)$$

$$[\eta] = KM_v^2 \,)$$

In the above formulas, c represents the polymer concentration (g/liter), is the intrinsic viscosity, K' is 0.28, K is $1.23 \times 10^{-5}$, $\alpha$ is 0.83, and $M_v$ is the viscosity average molecular weight.

In this invention, an excessively low viscosity average molecular weight will cause insufficient strength in the formation of an optical disc substrate- Conversely, an excessively high viscosity average molecular weight will make precise moldability of optical information recording difficult, because the melt viscosity of the polymer will become too high; therefore, either condition is undesirable. The average molecular weight of the polycarbonate resin can be adjusted by the ordinary method; specifically, by adding a well known end terminating agent, such as phenol or P-tertiary-butylphenol, into the copolymerization system.

The polycarbonate resin of the present invention must be manufactured with impurities such as foreign substances, reactive solvents, and salt byproducts initially reduced to the minimum possible level.

The polycarbonate resin for optical use must be mixed with at least one kind of carboxylic acid selected from aliphatic carboxylic acids having 1 to 10 carbon atoms, preferably 3 to 8, in which the hydrogen atoms of the aliphatic hydrocarbon group may be substituted by a hydroxyl group; and aromatic carboxylic acids, in which hydrogen atoms of the aromatic ring may be substituted by low alkyl groups, hydroxyl groups, or halogen atoms.

For aliphatic carboxylic acid, a univalent, bivalent, or trivalent acid may be used, preferably a univalent or a bivalent acid. Specific examples include the following acids; formic, acetic, propionic, adipic, succinic, fumaric, tartaric, and citric. Adipic and tartaric acids are the preferred types.

High fatty acids such as stearic and palmitic acids are not capable of suppressing point defects, and therefore are unsuitable as an additive for use in this invention.

The aromatic carboxylic acid normally has an aromatic ring, such as a benzene or naphtalene ring, to which a carboxyl group is substituted. In addition, those which are nuclear-substituted with low alkyl groups, hydroxyl groups, halogen atoms (preferably bromine or chlorine atoms), as substituents free of adverse effects, may be used. The low alkyl group usually contains 1 to 4 carbons. Aromatic carboxylic acid can include univalent to trivalent carboxylic acids; preferably, bivalent or trivalent carboxylic acid.

Specific examples of these aromatic carboxylic acids include benzoic, hydroxybenzoic, bromobenzoic, methylbenzoic, phthalic, terephthalic, isophthalic, trimellitic, trimesic, naphthoic, and naphthalenedicarboxylic acids; the preferred acids are terephthalic, isophthalic, trimellitic, and trimesic.

The aliphatic or aromatic carboxylic acid used in the present invention (hereinafter referred to as the additive of the present invention) is mixed with the polycarbonate resin at 5 to 1000 ppm relative to the resin (a range of 10 to 800 ppm is preferable, with 20 to 700 ppm as the more preferable range.) An insufficient amount of the additive makes it impossible to sufficiently suppress point defects when a molded disc is stored at high temperatures and humidity. An excessive amount on the other hand, will adversely affect certain features of the optical disc substrate—for example, its adhesion to metal recording layers.

In one mixing method, the additive of the present invention is added to the polycarbonate resin prior to the optical product molding process. The additive can be added into the powdery, granular or pelletized polycarbonate resin. Preferably, the additive is added to resin powder or granules, then pelletized, and used for molding of optical products, so the additive is uniformly diffused. The mixing may be performed with an ordinary mixer or with a hopper of a pelletizer or molder. In either case, a predetermined amount of the additive is added to the polycarbonate resin. The additive of the present invention may be added in the form of powder or aqueous solution. However, when adding in the form of aqueous solution, it is necessary to make sure that the water content in the resin does not exceed 5000 ppm.

Additionally to the above additive—either an aliphatic carboxylic acid or an aromatic carboxylic acid—other additives, such as a heat stabilizer or mold releaser, may be mixed as required, without causing any problems.

However, it is desirable to use as few addition as possible. Additives which are used should be ones which do not have an adverse effect on the quality of the optical products, and they should be used at the minimum required quantity.

Suitable heat stabilizers include phosphorus acid esters such as trisnonylphenylphosphite, tridecylphosphite, and di (monononylphenyl)-dinonylphenylphosphite. Suitable mold releasers include stearic acid monoglyceride, behenic acid monoglyceride, pentaerythritol monoglyceride, stearylstearate, and pentaerythritol tetra stearate. Any of these additives must have a high purity, and may have to be refined before they are used.

These additives can be added at the same time that the additive of the present invention is added, or they can be added separately. The method of addition is the same as the one described previously for adding the additive of the present invention.

The most preferable molded products for optical use obtained from polycarbonate resin composition of the present invention include the optical disc substrate, which is highly susceptible to the effects of the present invention. However, this invention can also be applied to other products such as optical lenses and prisms.

While there are different methods for forming these optical products, injection molding is often used. In this process, the molding temperature (resin temperation) should be 330° to 400° C., with an injection pressure of 1,000 to 2,000 kg/cm$^2$G. The optical disc substrate, which has the shape of a disk, is 0.8 to 2 mm in thickness, and 6 to 40 cm in diameter.

According to the present invention, when manufacturing an optical product made of polycarbonate resin, a long-term product stability can be assured by adding the specific additive of the present invention, without impairing the transparency of the product. For instance, optical disc substrate manufactured from the polycarbonate resin composition of the present invention will cause very few internal defects in the substrate even if it is stored at high temperatures and humidity for an extended period of time. Therefore, when an information recording layer is formed on this substrate, and the optical disc is manufactured, the result will be an optical disc with an extremely -high level of reliability.

Next, a detailed explanation will be given of this invention's examples. However, this invention should not be limited to these examples, provided its essence is not altered.

EXAMPLES 1 THROUGH 14, AND CAPACITIVE EXAMPLES 1 AND 2

(i) Manufacturing of polycarbonate resin

A 13.5% aqueous solution of sodium salt of bisphenol A, prepared by dissolving a 100 weight part of bisphenol A into 640 weight part of 5.6% sodium hydroxide aqueous solution, was mixed homogeneously with 340 weight part of methylene chloride, then it was introduced with 48.7 weight part of phosgene, and reacted at room temperature to generate an oligomer.

Subsequently, the reaction mixture containing the oligomer was separated to the water and methylene chloride phases. The methylene chloride phase was mixed with a 270 weight part of methylene chloride, a 160 weight part of 5% sodium hydroxide aqueous solution, a 3.95 weight part of P-tertiary butylphenol, and a 2.44 weight part of 2% triethylamine aqueous solution, and interfacial polymerization was accomplished by means of vigorously shaking the solution at room temperature. The mixture thus obtained was separated into water and methylene chloride phases.

The methylene chloride phase thus prepared, which contained polycarbonate product, was thoroughly washed with ① water, ② hydrochloric acid, ③ water in this order repeatedly, and discharged into a vessel holding water kept at 45° C., where it was stirred by a shear blade, in order to evaporate methylene chloride and, at the same time, to precipitate the polycarbonate resin granules. These granules were separated from the solution and dried, to recover the polycarbonate resin.

The viscosity average molecular weight of this polycarbonate resin is 14,500, with a whole light transmittance of 93%.

(ii) Forming an optical disc substrate

The polycarbonate resin thus recovered was added uniformly with:

① Stearic acid monoglyceride as a mold releaser at 100 ppm
② Di (mononoylphenyl-mono(dinonylphenyl)-phosphite as a heat stabilizer at 100 ppm;
and ③ the additive of the present invention shown in Tables 1-2 was molten at a temperature of 270° C., kneaded, extruded, and then cut, using a 40 mm $\phi$ pelletizer to obtain pellets of polycarbonate resin.

Using these pellets, optical disc substrates (130 mm in diameter and 1.2 mm in thickness) were formed using a disc injection molding machine, at a forming resin temperature of 370° C., to obtain optical disc substrates made of polycarbonate resin. The optical disc substrates thus obtained all exhibited good transparency, and were completely free from internal defects.

The polycarbonate substrates (five each) thus obtained were subjected to retention test at high temperatures and humidity to test for point defects and evaluate substrate transparency. The results are shown in Tables 1 and 2.

The number of point defects and the transparency were assessed by the following method:

1) Measurement of point defects:

Five optical disc substrates formed by injection molding were tested for retention at a constant temperature of 85° C. and humidity of 85% for a duration of 500 hours, and then calculated the total number of point defects having diameter of 20 microns or more which developed in the tested substrates; this number was divided by five to obtain the average number per substrate.

2) Transparency

The five optical disc substrates after the retention test per 1) above, were stacked, and the coloring and transparency as observed from the side were determined visually.

TABLE 1

| No. | Additive of the present invention Kind | Amount (ppm) | Number of point defects per substrate | Transparency |
|---|---|---|---|---|
| Example 1 | Adipic acid | 30 | 0 | Good |
| Example 2 | Adipic acid | 60 | 0 | Good |
| Example 3 | Adipic acid | 120 | 0 | Good |
| Example 4 | Adipic acid | 250 | 0 | Good |
| Example 5 | Adipic acid | 500 | 0 | Good |
| Example 6 | Tartaric acid | 30 | 0 | Good |
| Example 7 | Tartaric acid | 60 | 0 | Good |
| Example 8 | Tartaric acid | 120 | 0 | Good |
| Example 9 | Tartaric acid | 500 | 0 | Good |
| Comparative Example 1 | — | 0 | 6.6 | Good |

TABLE 2

| No. | Additive of the present invention Kind | Amount (ppm) | Number of point defects per substrate | Transparency |
|---|---|---|---|---|
| Example 10 | Trimellitic acid | 30 | 0 | Good |
| Example 11 | Trimellitic acid | 60 | 0 | Good |
| Example 12 | Trimellitic acid | 130 | 0 | Good |
| Example 13 | Trimellitic acid | 500 | 0 | Good |
| Example 14 | Trimellitic acid | 500 | 1.6 | Good |
| Comparative Example 2 | — | 0 | 6.6 | Good |

What is claimed is:

1. A transparent polycarbonate resin composition for optical use comprising a polycarbonate resin and at least one aromatic carboxylic acid in which hydrocarbon atoms of the aromatic ring may be substituted by lower alkyl groups, hydroxyl groups, or halogen atoms, the amount of which is 5 to 1000 ppm based on the polycarbonate resin.

2. A transparent polycarbonate resin composition for optical use, as claimed in claim 1, where the aromatic carboxylic acid is a bivalent or trivalent carboxylic acid.

3. A transparent polycarbonate resin composition for optical use, as claimed in claim 1, where the aromatic carboxylic acid has its carboxylic group substituted to an aromatic benzene ring.

4. A transparent polycarbonate resin composition for optical use, as claimed in claim 2, where the aromatic carboxylic acid is trimellitic acid.

5. A transparent polycarbonate resin composition for optical use, as claimed in claim 1, where the amount of the aromatic carboxylic acid is 10 to 800 ppm based on the polycarbonate resin.

6. A transparent polycarbonate resin composition for optical use, as claimed in claim 1, where the polycarbonate resin is manufactured using 2,2-bis (4-hydroxyphenyl) propane as a monomer constituent.

7. A transparent polycarbonate resin composition for optical use, as claimed in claim 1, where the viscosity average molecular weight of the polycarbonate resin is 12,000 to 20,000.

8. A transparent polycarbonate resin composition for optical use, as claimed in claim 1, where the viscosity average molecular weight of the polycarbonate resin is 13,000, to 18,000.

9. A transparent optical disc substrate made of the polycarbonate resin composition as claimed in claim 1.

10. A transparent optical disc substrate, as claimed in claim 9, obtained by the injection molding process.

11. A transparent optical disc substrate, as claimed in claim 9, where the number of point defects having the diameter of 20 microns or more which developed in the substrate is less than one, when the substrate was retained at a temperature of 88° C. and humidity of 88% for 500 hours.

12. A transparent polycarbonate resin composition for optical use, as claimed in claim 1, where the aromatic carboxylic acid is selected from the group consisting of benzoic, hydroxybenzoic, bromobenzoic, methylbenzoic, phthalic, terephthalic, isophthalic, trimellitic, trimesic, naphthoic and naphthalenedicarboxylic acids.

13. A transparent polycarbonate resin composition for optical use, as claimed in claim 1, wherein the aromatic carboxylic acid is terephthalic acid.

14. A transparent polycarbonate resin composition for optical use, as claimed in claim 1, where the aromatic carboxylic acid is isophthalic acid.

15. A transparent polycarbonate resin composition for optical use, as claimed in claim 1, where the aromatic carboxylic acid is trimesic acid.

* * * * *

UNITED STATES PATENT AND TRADEMARK OFFICE
CERTIFICATE OF CORRECTION

PATENT NO. : 5,350,790
DATED : September 27, 1994
INVENTOR(S) : Yoshitomi URABE, et al.

It is certified that error appears in the above-indentified patent and that said Letters Patent is hereby corrected as shown below:

On the title page, Item [*], the Terminal Disclaimer Date is listed incorrectly. It should read:

--Oct. 19, 2010--

Signed and Sealed this

Twenty-seventh Day of December, 1994

Attest:

BRUCE LEHMAN

Attesting Officer        Commissioner of Patents and Trademarks